United States Patent [19]

Yvan

[11] Patent Number: 4,553,978

[45] Date of Patent: Nov. 19, 1985

[54] PROCESS FOR CONVERTING LIGNEOUS MATTER OF VEGETABLE ORIGIN BY TORREFACTION, AND PRODUCT OBTAINED THEREBY

[75] Inventor: Schwob Yvan, Paris, France

[73] Assignee: Association pour la Recherche et le Developpement des Methodes et Processus Industriels, Paris, France

[21] Appl. No.: 410,636

[22] Filed: Aug. 23, 1982

[30] Foreign Application Priority Data

Aug. 28, 1981 [FR] France ............................ 81 16463

[51] Int. Cl.$^4$ .............................................. C10L 5/00
[52] U.S. Cl. ...................................... 44/1 E; 44/1 R; 44/10 B; 44/53; 44/77; 201/23; 208/10; 562/515; 562/607; 585/16; 585/240
[58] Field of Search ................... 44/1 R, 1 E, 1 D, 93, 44/10 A, 10 B, 10 D, 1 F, 77; 201/2.5, 6, 23; 562/515, 607; 208/10; 585/240, 16

[56] References Cited

U.S. PATENT DOCUMENTS

| | | | |
|---|---|---|---|
| 1,015,519 | 1/1912 | Strobach | 201/2.5 |
| 2,151,166 | 3/1939 | Slatineanu | 585/240 |
| 2,177,557 | 10/1939 | Bergstrom et al. | 585/240 |
| 2,289,917 | 7/1942 | Lambiotte | 201/34 |
| 2,328,749 | 9/1943 | Sherrard et al. | 585/250 |
| 2,725,346 | 11/1955 | Farber | 201/2.5 |
| 3,223,698 | 12/1965 | Oshima et al. | 585/240 |
| 4,052,292 | 10/1977 | Espenschied et al. | 208/8 |
| 4,118,281 | 10/1978 | Yan | 201/23 |
| 4,273,643 | 6/1981 | Bennett | 201/2.5 |

FOREIGN PATENT DOCUMENTS 1439950  6/1976  United Kingdom ................ 44/1 E

*Primary Examiner*—D. E. Gantz
*Assistant Examiner*—Anthony McFarlane
*Attorney, Agent, or Firm*—Murray, Whisenhunt & Ferguson

[57] ABSTRACT

The present invention relates to a process for converting ligneous matter of vegetable origin by torrefaction, and to the product obtained. Wood or any other ligneous matter is subjected in a neutral atmosphere to a treatment of torrefaction at a temperature of between 200° and 280° C., and preferably between 240° and 260° C. for a duration of 30 mins. to 5 hours. The product of the invention is not fermentable, it has a specific mass close to 0.25 kg/dm$^3$, a calorific power of at least about 5000 kcal/kg, a content of fixed carbon of 35 to 40% and can be broken up by hand; it may be used as fuel in boilers and in gas generators.

15 Claims, No Drawings

PROCESS FOR CONVERTING LIGNEOUS MATTER OF VEGETABLE ORIGIN BY TORREFACTION, AND PRODUCT OBTAINED THEREBY

BACKGROUND OF THE INVENTION

The invention relates to a process for converting, by torrefaction, ligneous matter of vegetable origin or lignocellulosic vegetable matter into a novel product, and also to this novel product.

It is a principal aim of the invention to propose a novel process for obtaining a novel product which has novel properties and is much easier to use, and contains substantially all the potential thermal energy of the starting ligneous matter, for a notably increased caloric value.

It is a further object of the invention to allow all types of ligneous matter of vegetable origin, such as wood, bark, saw-dust, bales of rice, walnut shells, fruit stones, straw, flax anas, bagasse, etc . . . to be used.

SUMMARY OF THE INVENTION

These aims are attained, according to the invention, by subjecting all of the ligneous matter of vegetable origin to a treatment of torrefaction in a neutral atmosphere i.e., a medium which under the heating conditions is substantially inert to the ligneous matter, at a temperature of between 200° and 280° C., preferably between 240° and 260° C.

Torrefaction of wood is an operation which is already well known. In particular, French Pat. No. 953 004 and Swiss Pat. No. 228,877 describe a so-called torrefaction operation which takes place from 250° to 350° C. and from 250° to 300° C. respectively, without any precision relative to the atmosphere in which the operation is carried out, from which it is concluded that the atmosphere is of no particular importance and that, in practice, the operation is carried out in a normal ambient atmosphere.

The merit of the invention is to have recognized that the limit of 250° C. is of considerable importance. Real torrefaction occurs only below 280° C. Above this temperature, there is the risk of a phenomenon of pyrolysis which, being exothermic, is virtually uncontrollable and is accompanied by decomposition of the ligneous matter, with formation of tar, as stated in Pat. No. 228 877 mentioned above.

Torrefaction according to the invention consists in heating such that none of the ligneous matter being heated exceeds 280° C.—and preferably 260° C.—in order to be sure, particularly when operating under dry conditions, that there is no risk of the temperature going beyond 280° C. at certain points or portions of the ligneous matter being heated and that there is no risk of triggering of an exothermic reaction of pyrolysis. For this same reason, i.e., of an exothermic reaction, it is also important to operate in a neutral, i.e., inert, atmosphere.

Applicant has found that the treatment carried out in this manner is a real torrefaction, without pyrolysis, which unexpectedly leads to a novel product having its own characteristics which are specified in detail hereinafter. The process of the invention may be applied to any agricultural or forestry ligneous waste, of any granulometric dimension whatsoever, it being specified that, for convenience of use, the finest products may be previously agglomerated by any known means, for example in the form of straw or saw-dust croquettes. Inversely, pieces of wood can be previously broken into fragments before the torrefaction treatment.

The duration of treatment depends both on the size of the fragments as well as on the temperature. For a size of the order of 1 cm$^3$, the duration of treatment may be 30 mins. at 280° C., 1 hour at 250° C. and 2 hours at 230° C. It may attain 5 hours for fist-sized pieces.

The starting products may be dry or moist and may be subjected to the treatment either directly, i.e. dry, or in a liquid bath.

The product obtained under the operational conditions of the process according to the invention is very clearly different from wood and wood charcoal. It is even very different from the so-called "brown" charcoal obtained by carbonization of the wood at low temperature.

The product of the invention presents advantageous features. It is brown in colour, it is highly friable, although less so than wood charcoal, as it may be broken up by hand and may therefore be easily crushed by any known economical means. It is not fermentable. Its caloric value is at least about 5000 kcal/kg (20900 Kj/Kg). Its apparent specific mass is close to 0.25 kg/dm$^3$ and its hygroscopicity is very low, less than 3%. The fixed carbon is between 35 and 40%, the difference being constituted by volatile matters and ash. Its reactivity is high.

It appears that the treatment modifies the hemicelluloses contained in the wood, or other ligneous matter, without affecting the cellulose and the lignin which are stable at the temperatures of treatment of the process of the invention. The hemicelluloses are apparently converted into a novel solid product which is more condensed and stable.

It further appears that torrefaction of the wood, or of any other ligneous matter, is accompanied by the liberation of almost all the acetic acid usually generated during carbonization. Consequently, the combustion of the product no longer suffers from the well known drawbacks which accompany combustion and gasification of wood and which are due to the corrosion provoked by the acid gases produced.

There are numerous possibilities of practical use of the combustible product according to the invention.

A wood-fired boiler adapts itself advantageously to this fuel which presents the following advantages over wood: high caloric value, possibility of using pulverized fuel due to friability of the matter, no liberation of corrosive acids, easy transport and storage, substantially no take-up of water during storage.

Functioning of a gas generator employing torrefied wood according to the invention is improved due to the properties of the product. Added to these are the reduction of humidity and of the tars in the gases and a better caloric value thereof.

In the possible subsequent carbonization of the torrefied wood of the invention, the high value of the fixed carbon, explained by the condensation of the hemicelluloses, leads to yields of charcoal higher than 35%, which figure is impossible to attain by direct carbonization of wood. The pyroligneous substances obtained contain fewer acids and fewer heavy products. They are broken up more easily.

As the torrefied wood of the invention can be crushed, its subsequent treatment by hydroliquefaction is facilitated. It is in the form of a raw material which can easily be manipulated by crushing and mixing, avoiding the well known drawbacks of direct use of wood.

In summary, the torrefied wood constitutes a definite, stable raw material, mid-way between wood and wood charcoal, opening up possibilities of new industrial uses. It enables hitherto unused agricultural and forestry ressources to be employed by converting them into a fuel which is particularly advantageous to handle.

The invention will be more readily understood with the aid of the examples given hereinbelow of embodiments of the process.

EXAMPLE 1

4 kg of platelets of oak of 14% humidity and with an average size of 1 cm$^3$, are introduced into a rotary kiln of 50 l. This chamber is placed in an atmosphere of nitrogen and is progressively taken to 250° C. at a slow temperature rise of 2° C. per minute. This temperature is maintained for two hours. After cooling, 2.5 kg of torrefied wood is collected, with 36% fixed carbon, of specific mass close to 0.25 kg/dm$^3$, and having a hygroscopicity of 3%. The pyroligneous phase collected by condensation is 1.3 kg. It contains 170 g of acetic acid.

EXAMPLE 2

2 kg of saw-dust croquettes of 5% humidity are introduced with 0.800 kg of oxo alcohol (cut $C_{13}$–$C_{15}$) in a rotary kiln, placed in an atmosphere of nitrogen. The temperature of the kiln is progressively increased at a slow temperature rise of 4° C. per minute until the alcohol has completely distilled. After cooling, 1.5 kg of torrefied wood is collected, with 38% fixed carbon, of specific mass close to 0.25 kg/dm$^3$ and having a hygroscopicity of 3%. In this example, the duration of the heat treatment corresponds substantially to the pseudo-stage of distillation of the alcohol and is thus shorter than in Example 1 (about 10 times), for a substantially identical degree of conversion.

The torrefied wood of the invention has a low hygroscopicity, which ensures it a reliability in use not encountered in wood and wood charcoal (high, variable hygroscopicity). It thus indirectly opens the way to an automatization of the installations which was hitherto not possible.

The following two uses may be mentioned:

(1) It is envisaged mounting wood-fired gas generators on heavy vehicles to reduce the amount of conventional fuels used. These gas generators present the following main drawbacks:
the energy yield expressed with respect to wood is low, which increases the supply of biomass in appreciable proportions;
gasification of the wood liberates acetic acid and heavy compounds which require particular technological means to avoid excessive corrosion and pollution.

The use of torrefied wood according to the invention avoids these drawbacks to a large extent since it considerably improves the overall profitability in energy terms as shown by the following figures:

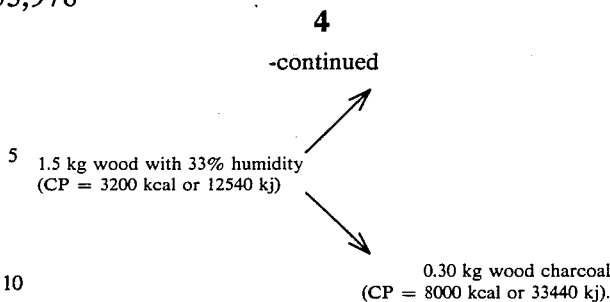

0.75 kg torrefied wood
(CP = 6000 kcal or 25080 kg)

1.5 kg wood with 33% humidity
(CP = 3200 kcal or 12540 kj)

0.30 kg wood charcoal
(CP = 8000 kcal or 33440 kj).

The product (energy yield of manufacture) x (caloric value) is thus maximum for the torrefied wood of the invention.

It has also been observed that heat treatment at a higher temperature of the torrefied wood of the invention produces little acetic acid (liberated mainly before its formation) and few heavy compounds. This simplifies the technology of the device to be adopted.

(2) It has been surprisingly observed that, in the presence of a conventional catalyst of hydrogenation, the torrefied wood of the invention may be rendered soluble in a solvent of the fuel, alcohol, oxo, . . . type when the torrefied wood/solvent mixture is subjected to hydrogen scavenging at ordinary pressure, at a temperature of the order of 250° C. A liquid fuel "ex wood" is thus obtained from the torrefied wood, which may be used in numerous ways.

I claim:

1. A process for converting ligneous matter to a torrefied wood product comprising:
   (1) slowing and progressively heating a feed consisting essentially of fragmented ligneous matter in a medium which under the heating conditions is substantially inert to the ligneous matter, and wherein the heating conditions are such that all of the ligneous matter being heated reaches a temperature of at least 200° C. but none of the ligneous matter reaches a temperature which exceeds 280° C.
   (2) maintaining the said heating step for a period of 0.5 to 5 hours;
   (3) removing pyroligneous gaseous products from the medium during the heating period;
   (4) cooling the heated product; and
   (5) recovering the resulting torrefied wood product.

2. The process of claim 1, wherein the ligneous matter is agglomerated before being subjected to the heating operation.

3. The process of claim 1, wherein the matter is heated in a liquid bath.

4. The process of any one of claims 2 and 3, wherein after the operation of conversion by heating, suspending the torrefied wood product in a solvent selected from the group consisting of fuel, alcohol and oxo-process product, and then hydrogenating said product by scavenging the torrefied wood product/solvent mixture with hydrogen at a temperature of about 250° C. to render the product totally soluble in the solvent and thus obtain a liquid fuel.

5. The process of claim 1 where said heating step occurs only below 260° C.

6. The process of claim 1 where said medium is gaseous.

7. The process of claim 1 where said medium is nitrogen.

8. The process of claim 1 where the hygroscopicity of said torrefied wood product is less than about 3%.

9. The process of claim 8 where said torrefied wood product has a caloric value of at least 5000 k cal/kg and a fixed carbon content of between 35 and 40%.

10. The process of claim 9 where said product is not fermentable.

11. The process of claim 1, wherein said temperature is between 230° C. and 260° C.

12. The process of claim 4, wherein said solvent is fuel or alcohol.

13. Torrefied ligneous matter of vegetable origin having a fixed carbon content of between 35 and 40%, a caloric value of at least 5000 kcal/kg A hydroscopicity of less than 3% and not being fermentable.

14. A liquid fuel obtained by suspending the matter of claim 13 in a solvent selected from the group consisting of fuel, alcohol and oxo-process product, and then scavenging the matter/solvent mixture with hydrogen at a temperature of about 250° C. to render the matter totally soluble in the solvent.

15. The liquid fuel of claim 14, wherein said solvent is fuel or alcohol.

* * * * *